(12) United States Patent
Mantri et al.

(10) Patent No.: US 11,614,801 B1
(45) Date of Patent: Mar. 28, 2023

(54) SYSTEMS AND METHODS FOR TRACKING USER INTERACTION WITH OBJECTS BASED UPON EYE MOVEMENTS

(71) Applicant: Verizon Patent and Licensing Inc., Basking Ridge, NJ (US)

(72) Inventors: Viraj C. Mantri, Mumbai (IN); Saikiran N. Chavali, Pune (IN); Srividhya Parthasarathy, Chennai (IN); Reshmi Philip, Kerala (IN)

(73) Assignee: Verizon Patent and Licensing ine, Basking Ridge, NJ (US)

( * ) Notice: Subject to any disclaimer, the term of this patent is extended or adjusted under 35 U.S.C. 154(b) by 0 days.

(21) Appl. No.: 17/578,606

(22) Filed: Jan. 19, 2022

(51) Int. Cl.
| | |
|---|---|
| G06F 3/01 | (2006.01) |
| G06V 40/16 | (2022.01) |
| G06F 3/04845 | (2022.01) |
| G06F 21/36 | (2013.01) |
| G06V 40/18 | (2022.01) |
| G10L 15/02 | (2006.01) |
| G10L 25/63 | (2013.01) |

(52) U.S. Cl.
CPC ............. *G06F 3/013* (2013.01); *G06F 3/012* (2013.01); *G06F 3/04845* (2013.01); *G06F 21/36* (2013.01); *G06V 40/171* (2022.01); *G06V 40/18* (2022.01); *G10L 15/02* (2013.01); *G10L 25/63* (2013.01)

(58) Field of Classification Search
CPC ..................................................... G06F 3/013
See application file for complete search history.

(56) References Cited

U.S. PATENT DOCUMENTS

2022/0334637 A1* 10/2022 Sharma ................... G06F 3/012

* cited by examiner

*Primary Examiner* — Gustavo Polo

(57) ABSTRACT

One or more computing devices, systems, and/or methods for tracking user interaction with objects based upon eye gazing movements are provided. A canvas is populated with grids corresponding to locations of objects and is populated with an eye cursor positioned to track a gaze of a user. A plurality of image frames captured by a camera are evaluated to track interaction of users with the objects. For an image frame, a midpoint between eyes of a user are identified based upon facial landmarks of the user. A current position of the eye cursor is set within the canvas based upon the midpoint. In response to detecting that the eye cursor intersects a first grid in the canvas, the user is identified as interacting with a first object associated with the first grid.

20 Claims, 14 Drawing Sheets

SYSTEMS AND METHODS FOR TRACKING USER INTERACTION WITH OBJECTS BASED UPON EYE MOVEMENTS

BACKGROUND

Cameras are used to obtain various types of information that may be used to improve the operation of devices. For example, a camera may capture imagery of a location, such as the inside of a store. The imagery may depict a user within the store. Accordingly, the imagery may be evaluated to track information related to the user. This information may be used to track the presence, movement, and/or actions of the user while in the store, such as for security reasons or customer tracking purposes.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
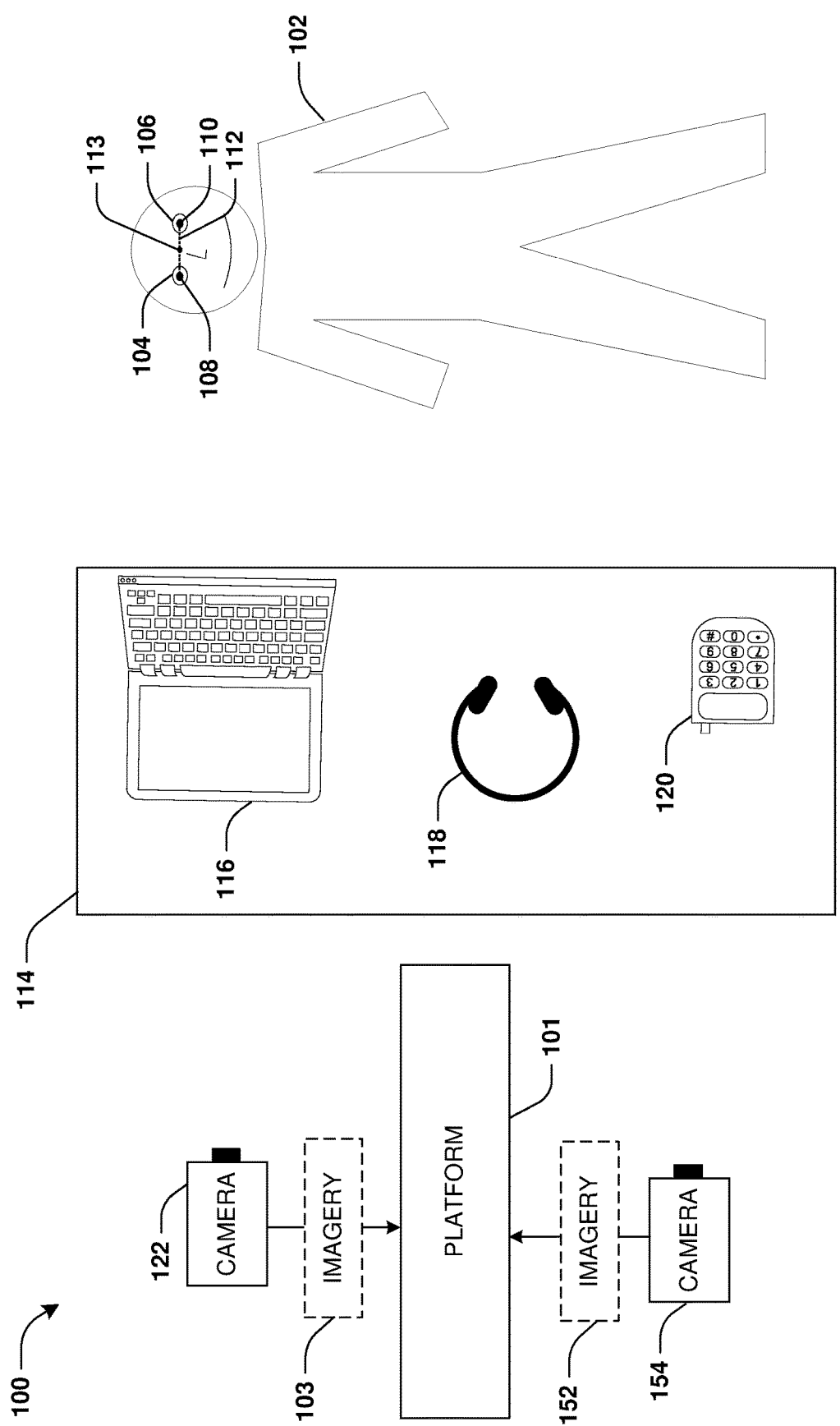
FIG. 1 is a diagram illustrating an example scenario associated with tracking user interaction with objects based upon eye gazing movements.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for tracking user interaction with objects based upon eye gazing movements are provided. In order to track eye gazing movements, one or more cameras may be positioned so that the cameras can capture image frames of where the objects are located, such as of a table where smart watches, headphones, tablets, laptops, food, books, items in a store, bikes, items within a home, outdoor objects such as a tree or trash can, and/or any other objects or devices are located. These image frames may be processed using a model that has been trained to identify facial landmarks of users, such as where a user walks up to the table and starts to look at the devices on the table. The facial landmarks may correspond to x, y, z coordinate points on a face of the user. The facial landmarks, such as facial landmarks of irises and pupils of the user, may be used to determine a midpoint between the eyes of the user. This midpoint is used to track where the user is gazing and eye gazing movements. In this way, the midpoint is used to detect whether the user is interacting with (e.g., gazing at, touching, picking up, trying on, etc.) the devices.

Various analytics and actions may be performed based upon whether users are interacting with objects. In an example, an interest or disinterest of the user with one of the devices may be determined based upon whether and/or how the user interacted with the object/device (e.g., the user picked up a book, the user put a grocery item in a shopping cart, the user turned on a stove in their kitchen, etc.) or ignored the object/device (e.g., the user walked past a bike section of a store without looking at the bikes). In another example, if a determination is made that the user is interacting with a device (e.g., a real-time determination that the user is currently trying on a pair of headphones), a command may be generated and transmitted to the device to modify operation of the device (e.g., turn on the pair of headphones to play music for the user).

Modifying operation of objects such as electronic devices based upon real-time detection of users interacting with the electronic devices can improve operation of the electronic devices by controlling the electronic devices based upon a current scenario of whether the electronic devices are being interacted with or not. For example, this can also improve battery and power consumption where the electronic devices can be turned off or placed into a low power mode when a determination is made that there are no users interacting with or looking at the electronic devices. The electronic device can then be turned on and/or controlled (e.g., controlling a smart watch to play a demo when a user puts on the smart watch) in real-time based upon a determination that a user is interacting with or looking at the electronic device.

FIG. 1 illustrates an example of a system 100 for tracking user interaction with objects based upon eye gazing movements. A platform 101 may be configured to track user interactions with the objects. In some embodiments, the platform 101 may be implemented as a cross platform application that may run on a server, a laptop, a smart phone, a smart watch, a tablet, a television, a container such as a Kubernetes container, hardware, software, or combination thereof. In some embodiments, the platform 101 may be connected to a camera 122, integrated into the camera 122, or capable of accessing storage within which the camera 122 stores image frames. The platform 101 may be configured to process image frames from imagery 103 captured by the camera 122 and/or other cameras, such as imagery 152 from a camera 154, in order to track interactions of users with objects depicted by the image frames.

The camera 122 may be oriented towards a surface 114 on which one or more objects are located. For example, a laptop 116, headphones 118, and a mobile device 120 may be positioned on the surface 114. The camera 122 may be oriented (e.g., located between about 3 feet and about 10 feet from the surface 114 or any other distance) such that the camera 122 can capture the imagery 103 of the surface 114, the objects on the surface 114, and users nearby the surface 114. For example, the camera 122 may capture the imagery 103 comprising image frames of a user 102 nearby the surface 114. The platform 101 may analyze these image frames using a model to determine whether the user 102 is interacting with any of the objects, such as gazing at one of the objects. The model may have been trained to identify landmarks of humans, such as facial landmarks of noses, lips, eyes, and/or other facial features, body feature for pose and movement detection, etc. The landmarks may corresponds to x, y, z coordinates of these features.

Using the facial features, the platform 101 can identify a left eye 106 and a right eye 104 of the user 102, such as a left pupil 110 or left iris and a right pupil 108 or right iris. The platform 101 is configured to calculate a midpoint 113 along a calculated line 112 between the left pupil 110 and the right pupil 108. The midpoint 113 corresponds to a current gaze of the user 102, which can be used to track eye gaze movements of the user 102. In this way, the midpoint 113 and changes in location of the midpoint 113 can be used to determine whether the user 102 is interacting with, such as looking at, an object from the surface 114. If the platform 101 detects that the user 102 is interacting with an object such as looking at the mobile device 120 on the surface 114, then the platform 101 may track an interest of the user 102 in the mobile device 120. The platform 101 may perform an action based upon the interest, such as by transmitting a command to the mobile device 120 to turn on or wake up the mobile device 120 and execute a demo application on the mobile device 120, which may prompt the user 102 to pick up and try out the mobile device 120.

Figure 2:
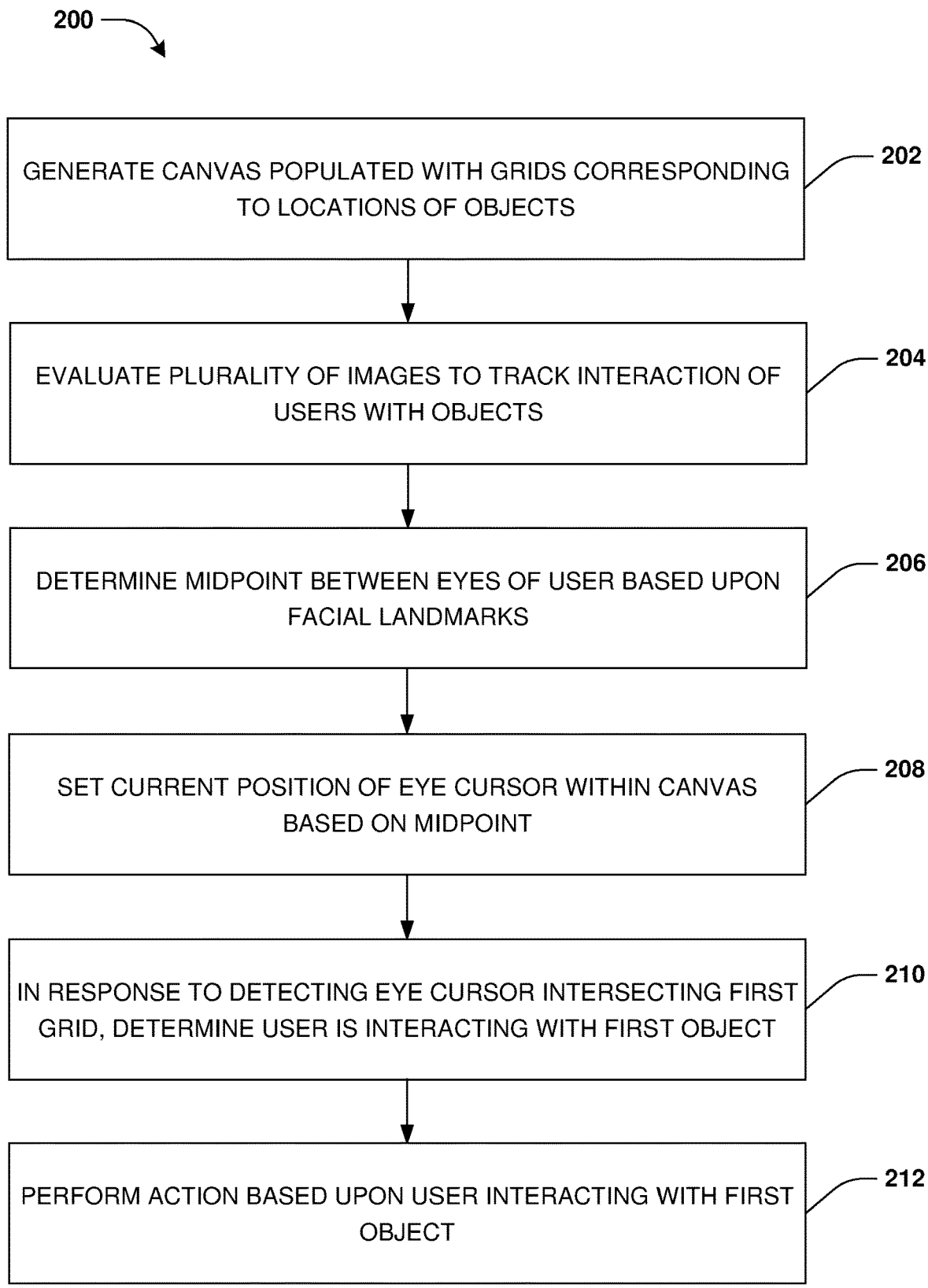
FIG. 2 is a flow chart illustrating an example method for tracking user interaction with objects based upon eye gazing movements.
Figure 3A:
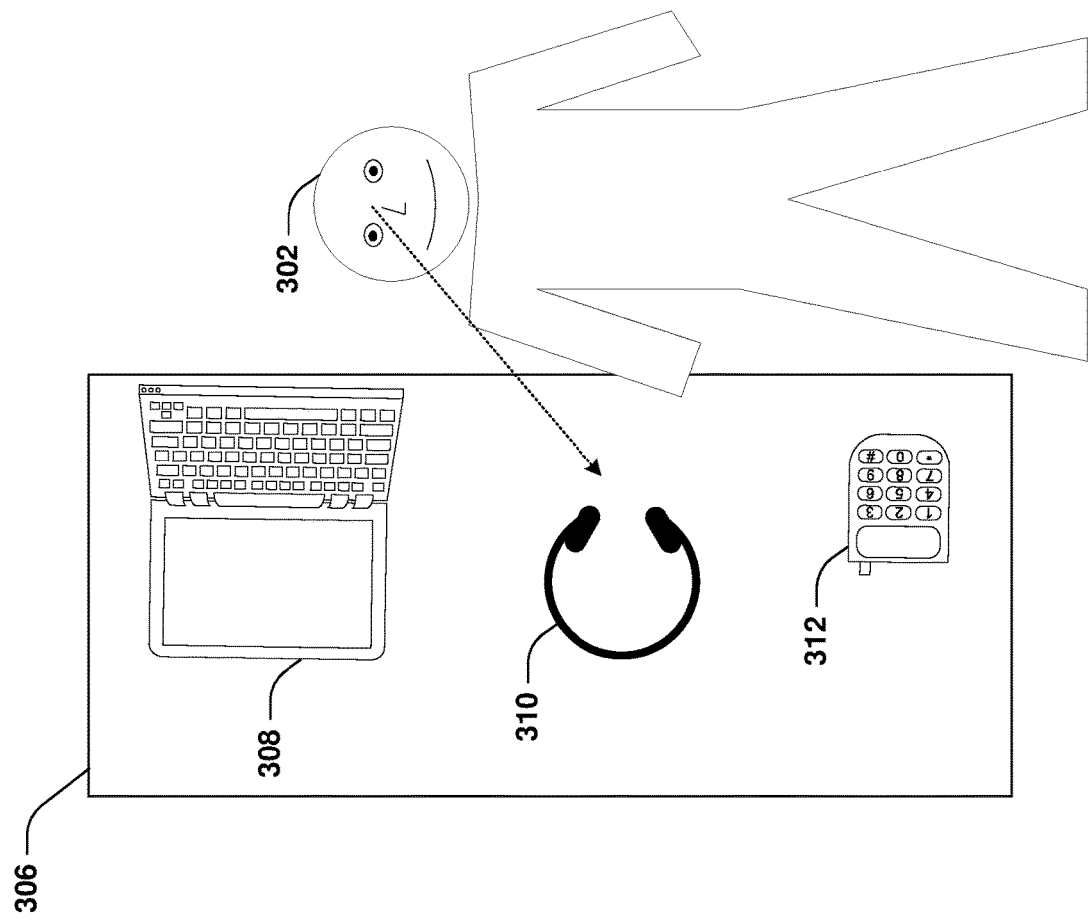
FIG. 3A is a diagram illustrating an example scenario associated with tracking user interaction with objects based upon eye gazing movements.
Figure 3A:
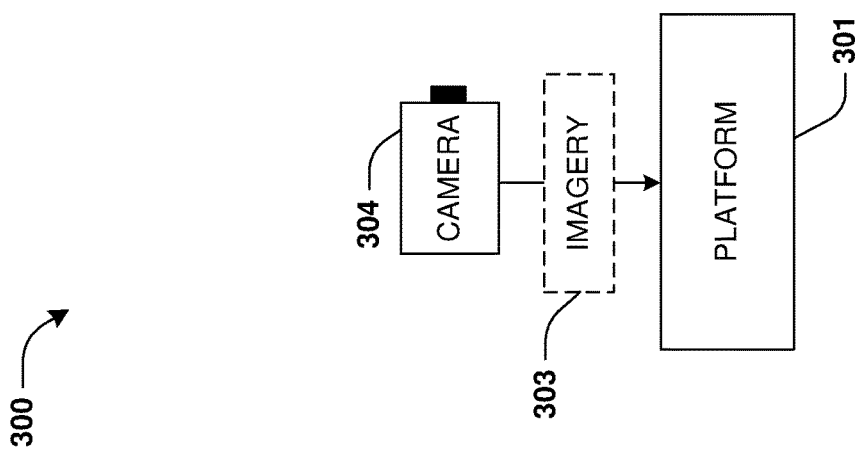
Figure 3B:
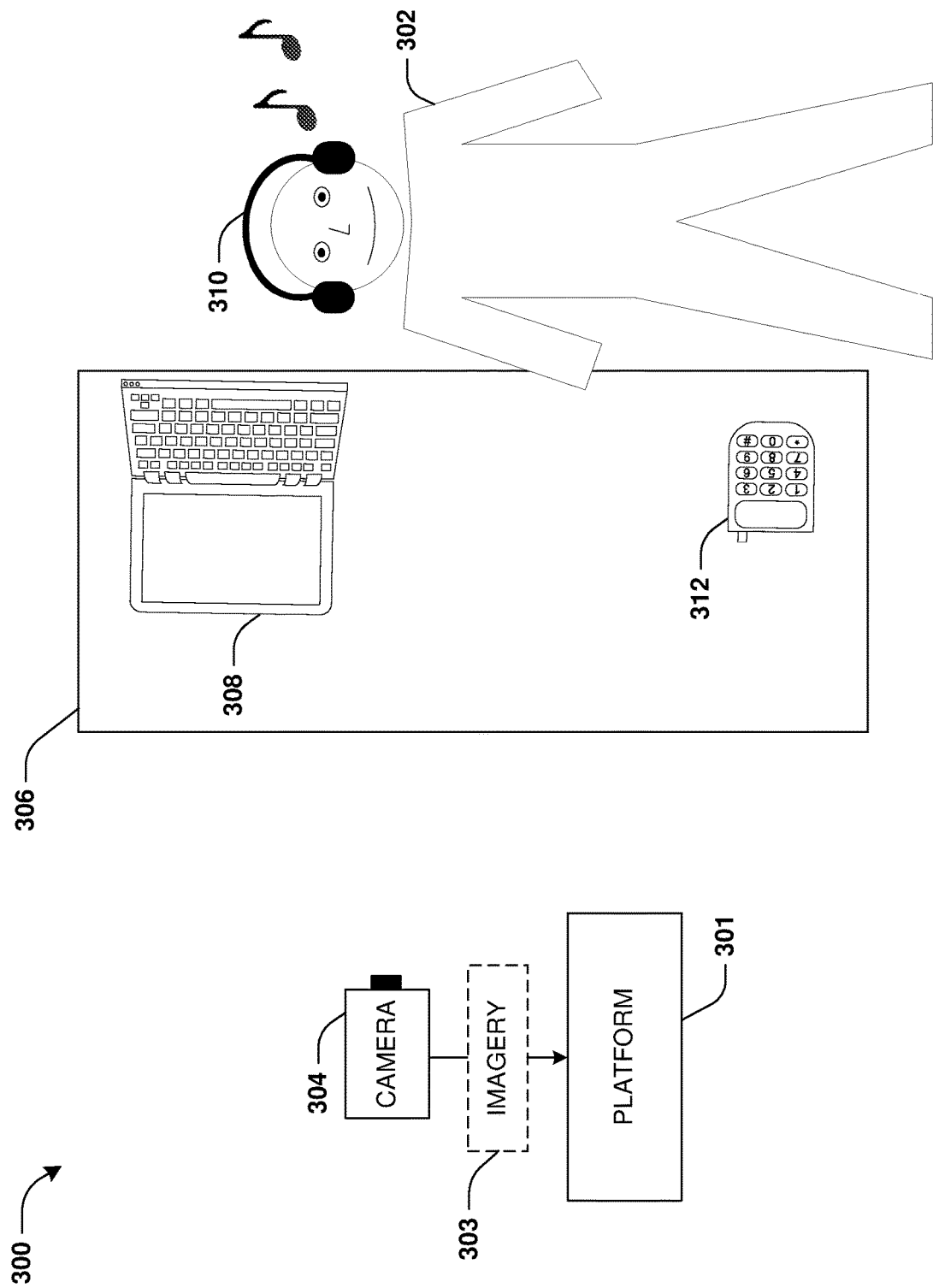
FIG. 3B is a diagram illustrating an example scenario associated with tracking user interaction with objects based upon eye gazing movements.

FIG. 2 illustrates an example of a method 200 for tracking user interaction with objects based upon eye gazing movements, which is further described in conjunction with system 300 of FIGS. 3A and 3B. A platform 301 may be configured to track user interactions with objects on a table 306. The objects may correspond to any objects such as headphones 310, a mobile device 312, a laptop 308, and/or a wide variety of other types of objects (e.g., items for sale within a store such as grocery items, items within a building such as a door or desk, items within an outdoor location such as a trash can or water fountain, items within a home such as an appliance or a book, etc.). The platform 301 is configured to process image frames of imagery 303 captured by a camera 304 and/or other cameras in order to identify and track user interactions with the objects on the table 306.

During operation 202 of method 200, a canvas may be generated. In some embodiments, the canvas is a data structure (e.g., an internal data structure used by the platform 301 to store information) used by the platform 301 to track data and information used to track and associate user gaze and eye gaze movements with locations of objects. In some embodiments, the canvas is a user interface, such as a graphical user interface. Examples and further details of canvass will be subsequently described in relation to FIGS. 5A-5F.

The canvas may be populated with grids corresponding to locations of the objects on the table 306. For example, the canvas may be populated with a first grid corresponding to a location of the laptop 308, a second grid corresponding to the location of the headphones 310, and a third grid corresponding to a location of the mobile device 312. In some embodiments, the location, orientation, size, and shape of a grid may be defined and/or redefined/adjusted based upon user input. For example, a user may drag and drop a grid onto the canvas as a user interface element. The user may either input values or use a cursor to drag and drop the canvas in order to position, size, and/or orient the canvas. The user may subsequently resize, relocate, and/or reorient the grids within the canvas. In some embodiments, the location, orientation, size, and shape of a grid may be automatically defined based upon image recognition functionality used to process the imagery 303. That is, the image recognition functionality to identify and locate objects on the table 306, which is used to define grids representing locations of those objects.

The canvas may be populated with eye cursors for users detected in the image frames. For example, when the platform 301 identifies the user 302 within an image frame, an eye cursor representing a gaze of the user 302 may be populated within the canvas. If the canvas is a graphical user interface, then the eye cursor may be a user interface element. If the canvas is an internal data structure used to track data and information associating user gaze and eye gaze movements with locations of objects, then the eye cursor may be coordinate values of the user's gaze. If more than one user is detected, then multiple eye cursors may be associated with the canvas and used to track gazes of the user.

During operation 204 of method 200, a plurality of image frames, captured by the camera 304 as the imagery 303, may be evaluated by the platform 301 to track interaction of the user 302 (and/or other users that are detected) with the objects on the table 306. In some embodiments, the platform 301 may process the image frames in real-time as the camera 304 captures the imagery 303 of the user 302 so that the platform 301 may implement real-time actions in response to detected user interaction with the objects. Also, the platform 301 may evaluate the plurality of image frames to track real-time 3D object orientations and locations/movement of the objects (e.g., the user 302 may move or pick up an object).

A model, trained to identify facial landmarks of human faces in images and/or body landmarks of human bodies, may be used to process each image frame to identify facial landmarks, body landmarks, and/or other landmarks of the user. The facial landmarks may correspond to z, y, z coordinates of points on a face of the user 302, which may correspond to facial features of the user 302. For example, the landmarks may be identified based upon features extracted from an image frame. The features may correspond to iris features, body features, voice features, and/or facial features. The iris features may be used to track iris and head movement of the user 302 over time. The body features may be used to track body poses of the user 302 over time, such as the user picking up an object, the user putting on and wearing an object, etc. The voice features and the facial features may be evaluated for tone sentiment, text sentiment, and/or facial emotional expressions, such as where the user 302 smiles while trying on the headphones 310, the user 302 laughs while typing on the laptop 308, the user 302 looks bored or frowns when gazing at the mobile device 312, etc. These features may be used to help determine whether the user 302 has a positive or negative interest in an object.

Once the facial landmarks have been identified by the platform 301 using the model, the facial landmarks may be used to identify a left eye and a right eye of the user 302, such as a left pupil and a right pupil of the user 302. During operation 206 of method 200, a midpoint between the left eye (left pupil) and the right eye (right pupil) may be identified (e.g., a midpoint along a calculated line between the left and right pupils of the user 302). The midpoint may be used to represent a gaze of the user 302, and thus can be used to determine whether the user 302 is interacting with (gazing/looking at) an object on the table 306.

During operation 208 of method 200, a current position of the eye cursor within the canvas is set based upon the midpoint identified from the image frame. If the canvas is a data structure, then setting the current position may correspond to storing a coordinate value within an eye cursor field in the data structure. If the canvas is a graphical user interface, then the eye cursor may be visually positioned at the coordinate value.

During operation 210 of method 200, the current position of the eye cursor may be compared to the grids within the canvas to determine whether the eye cursor intersects any of the grids (or whether the coordinate value of the eye cursor overlaps coordinate values of a grid where the canvas is a data structure). If the eye cursor intersects a grid, then a determination may be made that the user 302 is interacting with an object whose location is represented by the grid. For example, the eye cursor may intersect the second grid representing the location of the headphones 310 (or the coordinate value of the eye cursor overlaps coordinate values of the second grid where the canvas is a data structure), and thus the platform 301 may determine that the user 302 is interacting with such as looking/gazing at the headphones 310. In some embodiments where the canvas is implemented as the graphical user interface, a display property (e.g., a color, shading, etc.) of the second grid may be modified based upon the eye cursor intersecting with the second grid.

During operation 212 of method 200, the platform 301 may implement an action based upon a determination that the user 302 is interacting with the headphones 310. In some embodiments, the action may correspond to that generation of tracking information indicating that the user 302 interacted with the headphones 310 or has an interest in the headphones 310. The action may correspond to generating and transmitting a notification to a remote device that the user 302 is/was interacting with the headphones 310 and/or has an interest in the headphones 310. The notification may be transmitted and displayed by a remote device that is nearby the table 306 or the user 302 (e.g., displayed to an employee of a store where the table 306 is located). In some embodiments, the action may correspond to tracking a timespan of the interaction by the user 302 with the headphones 310 by analyzing multiple image frames, and then outputting a level of interest of the user 302 in the headphones 310 based upon the timeframe (e.g., the longer the user 302 interacts with the headphones 310, the higher the interest). In some embodiments, the action may correspond to transmitting a command to the headphones 310 to modify operation of the headphones 310 such as to turn on and play music on the headphones 310 in response to the user interaction corresponding to the user 302 putting on the headphones 310, as illustrated by FIG. 3B.

The platform 301 may analyze user interactions with the objects over time using various analytics in order to generate various outputs. In some embodiments of performing the analytics, a heat map may be generated for the second grid based upon user interaction with the headphones 310. The heat map may comprise information that is based upon a length of user interaction, types of user interaction (e.g., a user gazing at the headphones 310, a user ignoring the headphones 310, a user picking up the headphones 310, a user trying out the headphones 310, etc.), a number of users interacting with the headphones 310, etc. The heat map may indicate a level of interest in the headphones 310. In response to the heat map indicating a level of interest that exceeds an interest threshold, an alert about the interest in the headphones 310 may be created and transmitted to a remote device, such as to the remote device of the employee nearby the user 302.

In some embodiments of performing the analytics, an idle time of the user 302 interacting with the headphones 310 may be determined based upon a time span of the eye cursor intersecting the second grid. In response to the idle time exceeding a threshold timespan (e.g., the user has gazed at the headphones 310 for over 8 seconds), an alert about the interest in the headphones 310 may be created and transmitted to a remote device, such as to the remote device of the employee nearby the user 302. In some embodiments of performing the analytics, the alert may be created and transmitted based upon the platform 301 detecting a threshold amount of changes in movement of the eye cursor over a time frame (e.g., rapid eye movement of the user 302 may be indicative of a higher interest in the headphones 310). In some embodiments of performing the analytics, a pattern of user interaction changes amongst the objects on the table 306 may be tracked based upon an order and duration of the eye cursor intersecting the grids of the canvas (e.g., the user 302 may look at the headphones 310 for 8 seconds, look at the laptop 308 of 1 second, and return to looking at the headphones 310 for another 15 seconds). The pattern may be used to determine an interest of the user 302, such as a high interest in the headphones 310 and little to no interest in the laptop 308.

Figure 4:
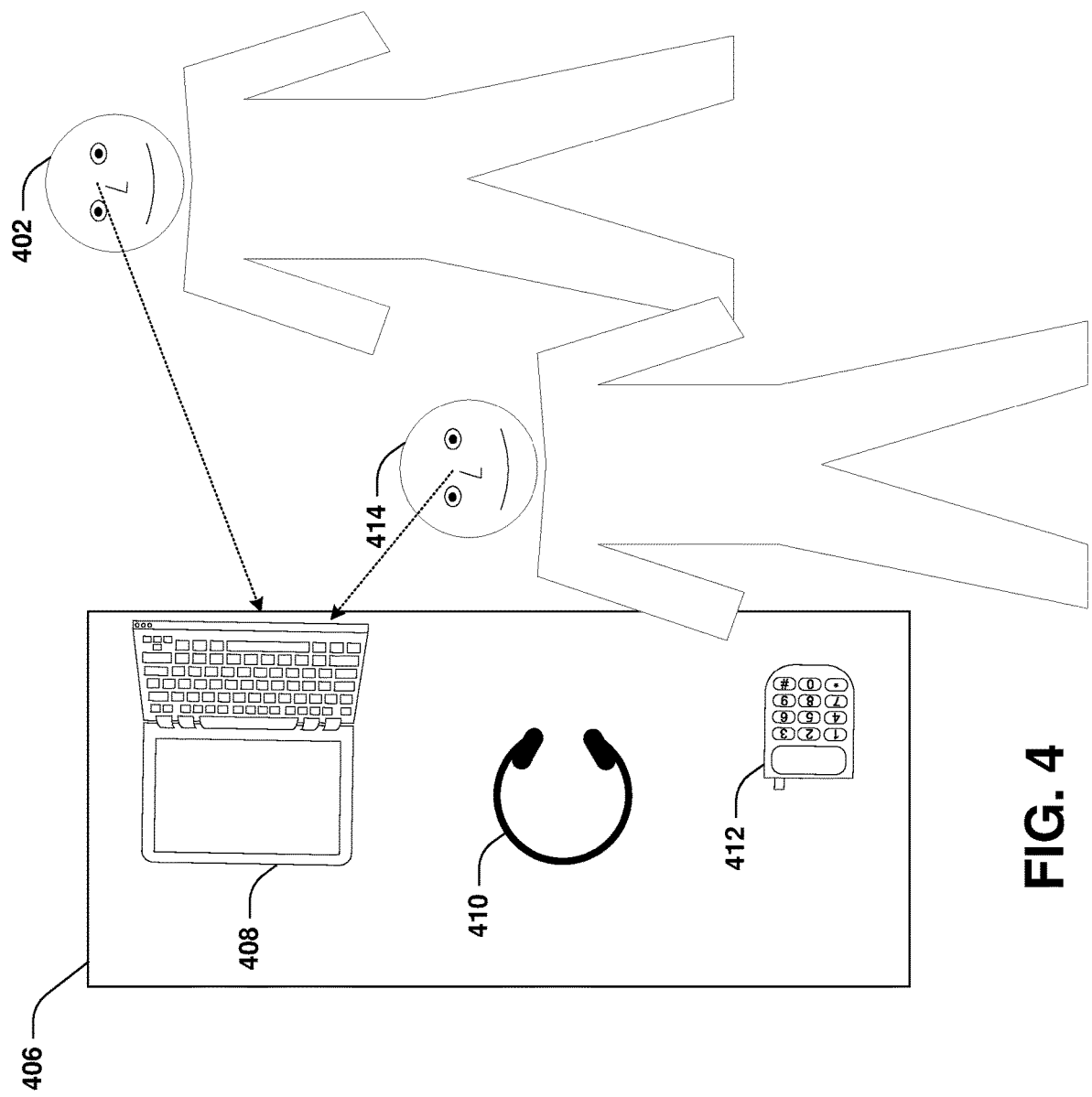
FIG. 4 is a diagram illustrating an example scenario associated with tracking user interaction of multiple users with objects based upon eye gazing movements.
Figure 4:
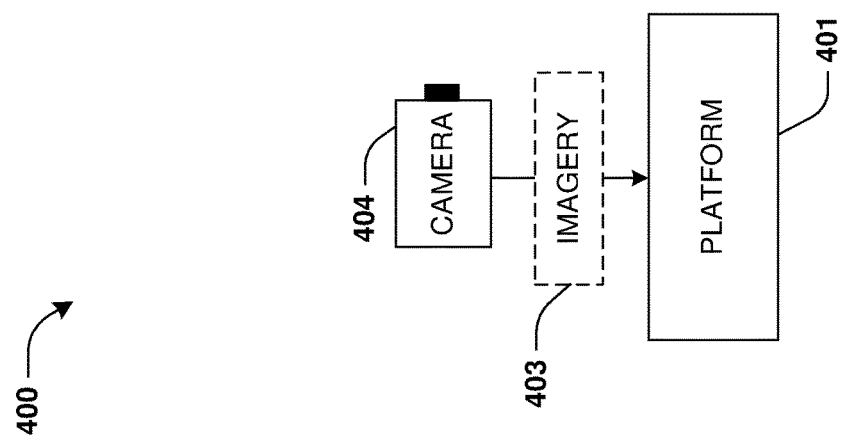

FIG. 4 illustrates a system 400 for tracking user interaction with objects by multiple users based upon eye gazing movements. A platform 401 may be configured to process image frames of imagery 403 detected by a camera 404 and/or other cameras not illustrated. The image frames may depict users interacting with objects, such as a first object 408, a second object 410, and a third object 412 on a surface 406. The platform 401 may be capable of identifying and distinguishing between a first user 402 and a second user 414. In this way, the platform 401 may process the image frames to detect whether the first user 402 is interacting with any of the objects, and whether the second user 414 is interacting with any of the objects.

Figure 5A:
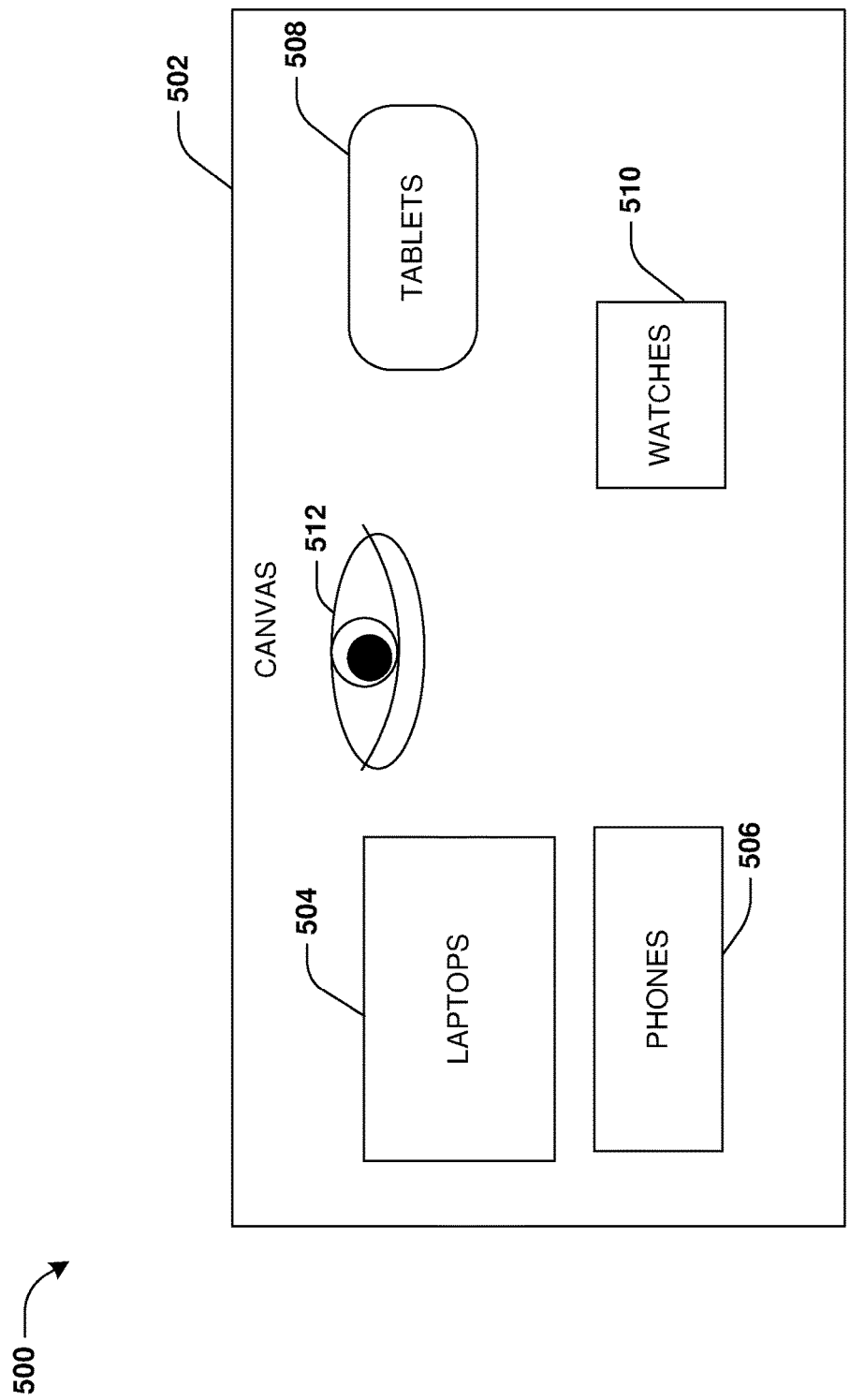
FIG. 5A is a diagram illustrating an example scenario associated with tracking user interaction with objects using a canvas.

FIGS. 5A-5F illustrate an example 500 of a canvas 502. The canvas 502 may be populated with one or more grids, such as a first grid 504, a second grid 506, a third grid 508, and a fourth grid 510, as illustrated by FIG. 5A. The first grid 504 may correspond to a location within a room where laptops are located. The second grid 506 may correspond to a location within the room where phones are located. The third grid 508 may correspond to a location within the room where tablets are located. The fourth grid 510 may correspond to a location within the room where watches are located. In some embodiments, the first grid 504, the second grid 506, the third grid 508, and the fourth grid 510 may be been created and placed within the canvas 502 by a user. For example, the user may have dragged and dropped grid user interface elements into the canvas 502, and may have specified size, shapes, and/or orientations for the grids. In some embodiments, the first grid 504, the second grid 506, the third grid 508, and the fourth grid 510 may have been automatically and/or programmatically created based upon a platform evaluating imagery of the room. Features of laptops depicted by the imagery may be extracted and used to create the first grid 504. Features of phones depicted by the imagery may be extracted and used to create the second grid 506. Features of tablets depicted by the imagery may be extracted and used to create the third grid 508. Features of watches depicted by the imagery may be extracted and used to create the fourth grid 510.

Figure 5B:
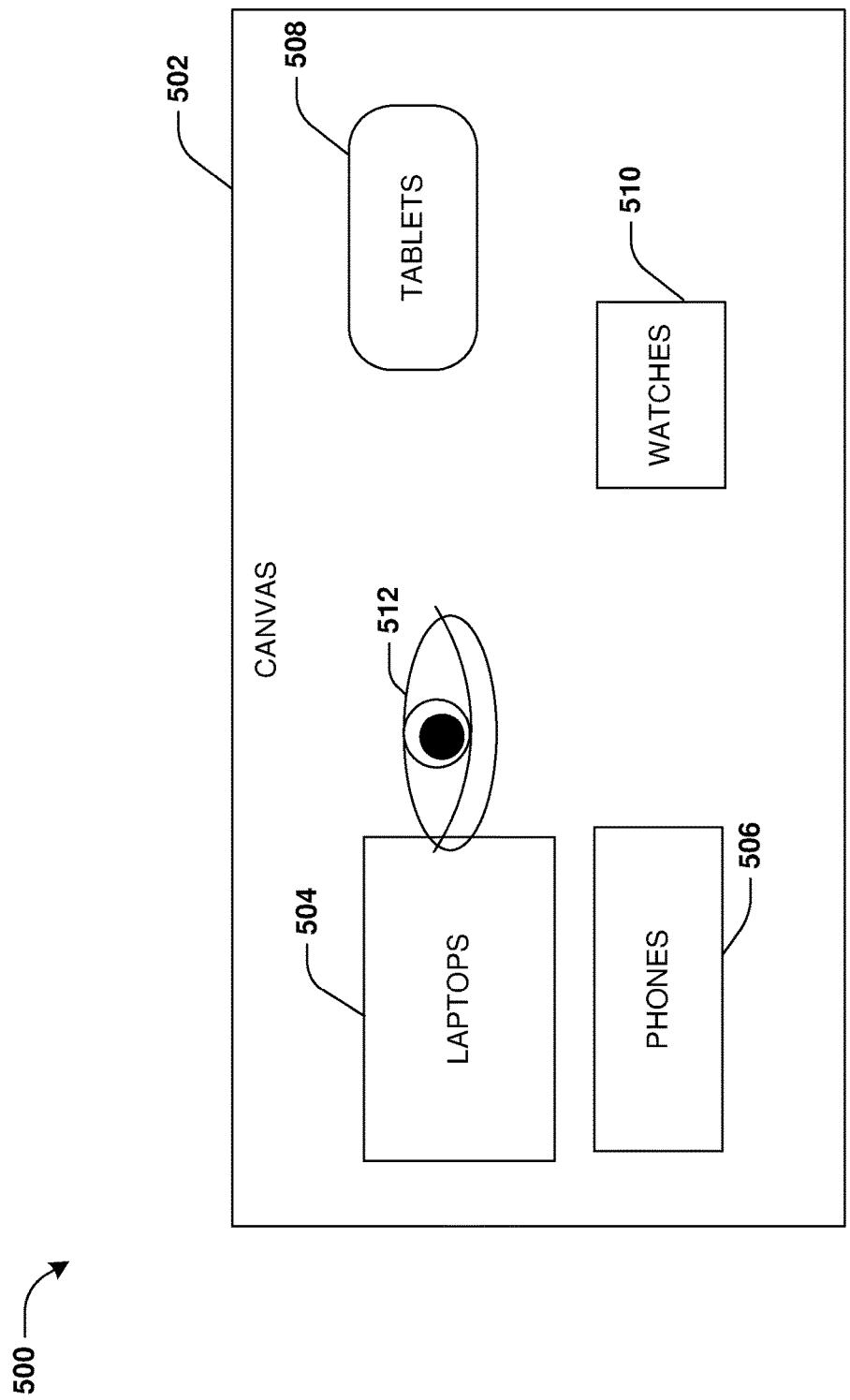
FIG. 5B is a diagram illustrating an example scenario associated with tracking user interaction with objects using a canvas.

The canvas 502 may be populated with an eye cursor 512. The eye cursor 512 may represent a current gaze location of a user depicted in image frames being processed by the platform. At a first point in time, the platform may process a first image frame to determine a midpoint between eyes of the user at the first point in time. A current position of the eye cursor 512 may be set to a first current position within the canvas 502 based upon the midpoint at the first point in time (e.g., the user may be looking towards the laptops), as illustrated by FIG. 5B.

Figure 5C:
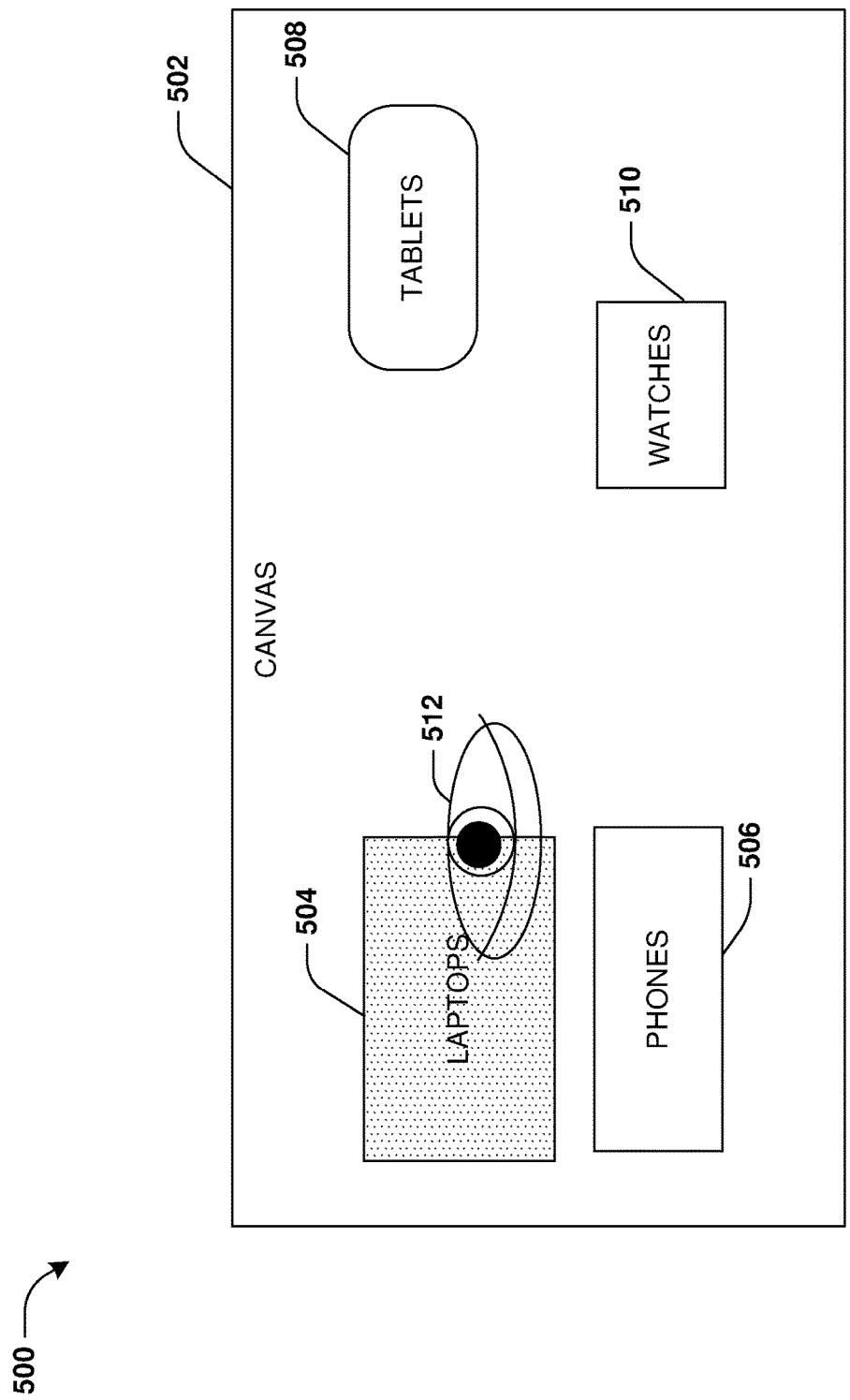
FIG. 5C is a diagram illustrating an example scenario associated with tracking user interaction with objects using a canvas.

At a second point in time, the platform may process a second image frame to determine a midpoint between eyes of the user at the second point in time. A current position of the eye cursor 512 may be set to a second current position within the canvas 502 based upon the midpoint at the second point in time (e.g., the user may be looking at a particular laptop), as illustrated by FIG. 5C. Because the eye cursor 512 (e.g., a pupil representation of the eye cursor 512) now intersects the first grid 504, the platform may determine that the user is interacting with the laptop such as looking at the laptop. In some embodiments, the platform may modify a display property of the first grid 504 (e.g., changing a fill color, charging a shading property, bolding text "laptops," increasing a line size of an outline of the first grid 504, etc.) based upon the intersection.

Figure 5D:
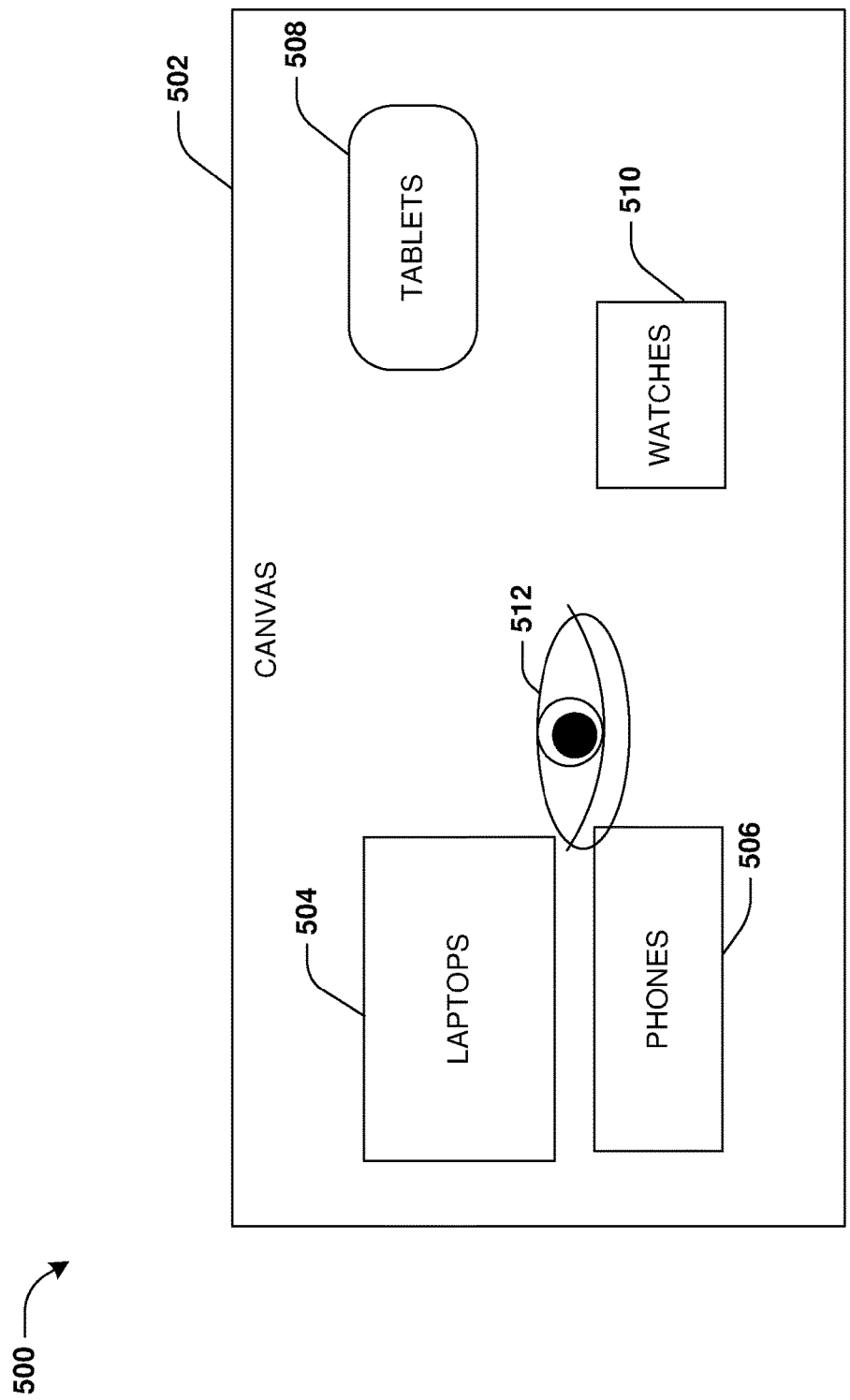
FIG. 5D is a diagram illustrating an example scenario associated with tracking user interaction with objects using a canvas.

At a third point in time, the platform may process a third image frame to determine a midpoint between eyes of the user at the third point in time. A current position of the eye cursor 512 may be set to a third current position within the canvas 502 based upon the midpoint at the third point in time (e.g., the user may be looking towards the phones), as illustrated by FIG. 5D.

Figure 5E:
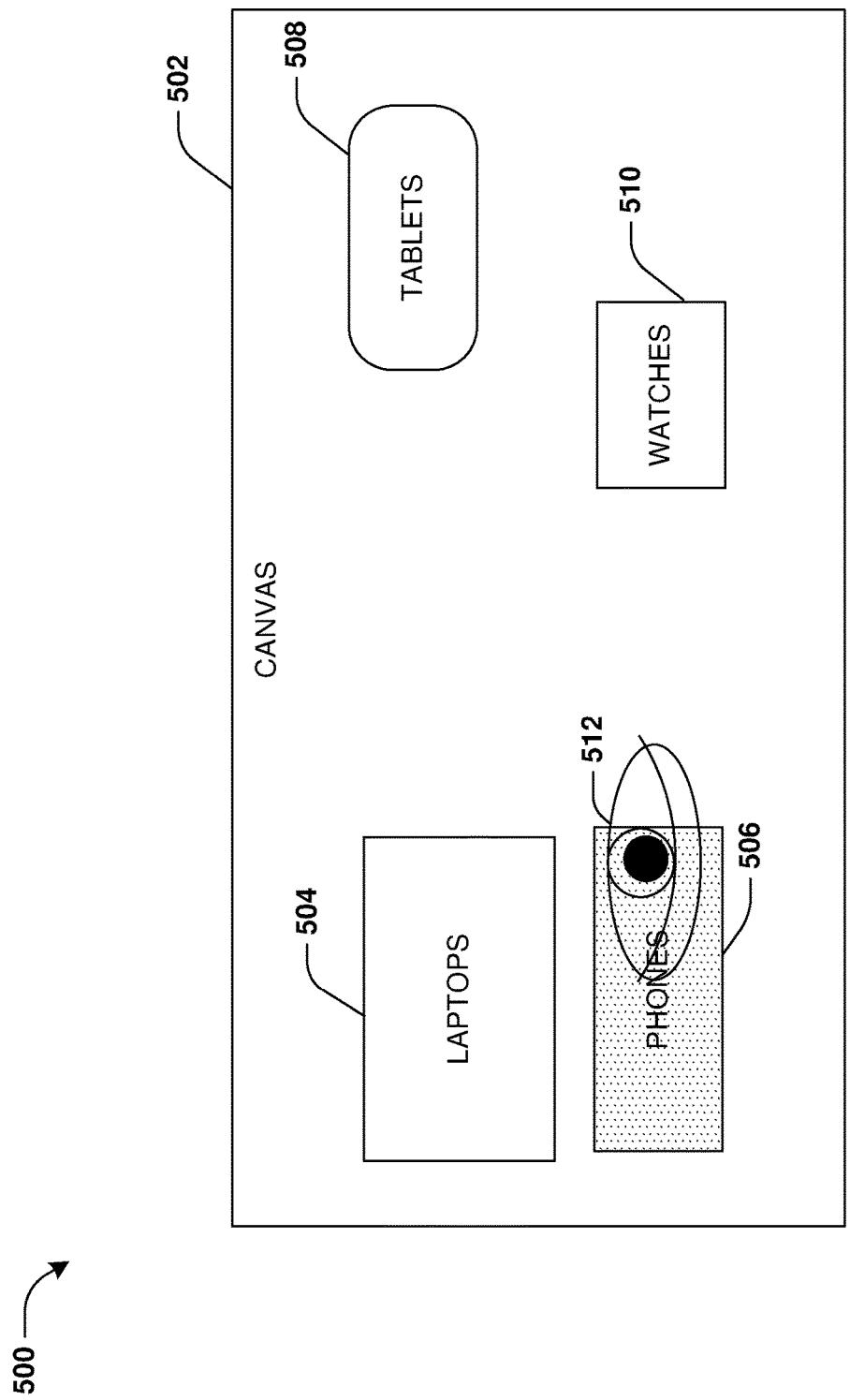
FIG. 5E is a diagram illustrating an example scenario associated with tracking user interaction with objects using a canvas.

At a fourth point in time, the platform may process a fourth image frame to determine a midpoint between eyes of the user at the fourth point in time. A current position of the eye cursor 512 may be set to a fourth current position within the canvas 502 based upon the midpoint at the fourth point in time (e.g., the user may be looking at a particular phone), as illustrated by FIG. 5E. Because the eye cursor 512 (e.g., a pupil representation of the eye cursor 512) now intersects the second grid 506, the platform may determine that the user is interacting with the phone such as by picking up the phone. In some embodiments, the platform may modify a display property of the second grid 506 (e.g., changing a fill color, charging a shading property, bolding text "phones," increasing a line size of an outline of the second grid 506, etc.) based upon the intersection.

Figure 5F:
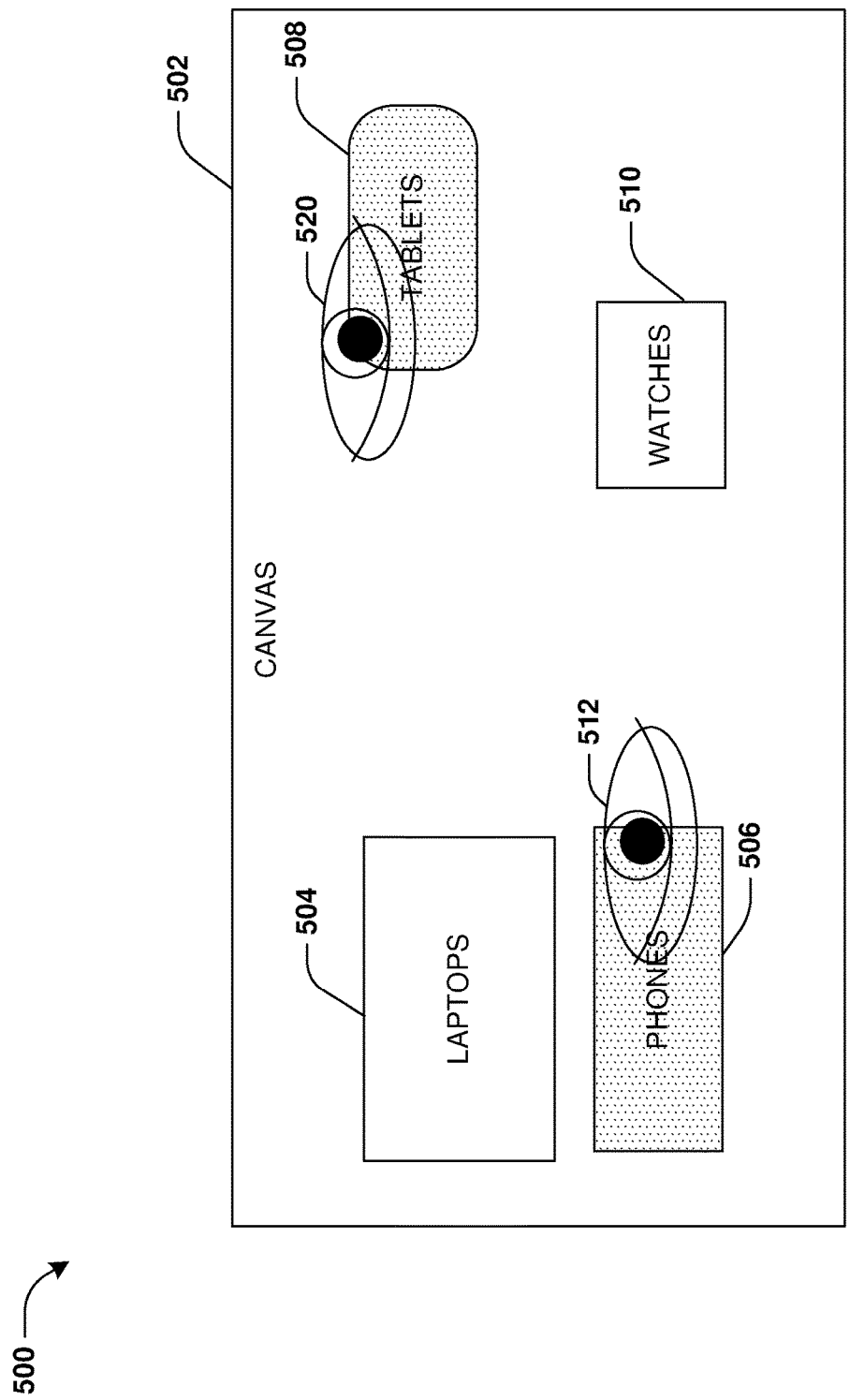
FIG. 5F is a diagram illustrating an example scenario associated with tracking user interaction of multiple users with objects using a canvas.

At a fifth point in time, the platform may process a fifth image frame to determine a first midpoint between eyes of the user and a second midpoint between eyes of a second user at the fifth point in time. A current position of the eye cursor 512 may be set to a fifth current position within the canvas 502 based upon the first midpoint at the fifth point in time (e.g., the user may still be holding the phone), as illustrated by FIG. 5F. Because the eye cursor 512 (e.g., a pupil representation of the eye cursor 512) intersects the second grid 506, the platform may determine that the user is still interacting with the phone. In some embodiments, the platform may modify a display property of the second grid 506 based upon the intersection. The canvas 502 may be populated with a second eye cursor 520 representing a gaze of the second user. A current position of the second eye cursor 520 may be set to a current position within the canvas 502 based upon the second midpoint at the fifth point in time (e.g., the second user may be looking at a tablet). Because the second eye cursor 520 (e.g., a pupil representation of the second eye cursor 520) intersects the third grid 508, the platform may determine that the second user is looking at the tablet. In some embodiments, the platform may modify a display property of the third grid 508 based upon the intersection.

In some embodiments, a platform may be used to authenticate users. For example, the platform may evaluate image frames of imagery captured by a camera to determine whether a user has interacted with objects according to an authentication code. In particular, the authentication code may be generated to specify a particular ordering with which a user is to interact with a particular set of objects. For example, a user may be authenticated if the user first touches their nose, then holds up 3 fingers, and finally blinks twice at a mobile device in order to unlock the mobile device. The objects may correspond to body parts of the user or may correspond to other types of objects (e.g., the user must first touch a box, then hold a pen, and finally stare at a keyboard for at least 4 seconds). In this way, the user may authenticate using the authentication code by interacting with one or more objects according to a particular order of interactions. Various actions may be performed once the user is authenticated, such as granting the user access to a device, an application, a website, an account, a door, a vehicle, etc.

In some embodiments, object tracking and gaze detection is implemented by a platform. In an example, while a user is gazing at a section on a table and picks up an object, the platform detects the object to understand the type and name of the object that the user is holding. The platform also understands the actions of the user with respect to the object by implementing pose detection. For example, if the user is picking up a mobile phone and looks around at the mobile phone, then then platform calibrates a pose of the user along with object (the mobile phone) that the user is holding. The platform generates a notification about the user's interest in the mobile phone. The platform also details out to which areas the user is gazing as the platform understands a relative distance between irises of the user to the object and an orientation of the object with respect to a screen. Similarly, if the user is lifting a headphone and brings the headphone closer to the ears of the user, then another trigger is generated for understanding the pose of the user in that the user is holding a headphone as the user brings the headphone nearer to the ears. This trigger can be used to trigger various actions such as to turn on music to automatically play through the headphone. Similarly, if the user is trying to wear a smart watch on a wrist, then a wrist pose is detected and this generates a trigger about the user's interest in trying out the smart watch. Displacement of a product from one grid to other grid is also tracked when the user lifts a product from one grid/section and displaces the product to another grid/section. This implies that the user is interested in multiple products at each of these grids/sections.

In some embodiments, real-time 3D object orientation is detected by the platform. In an example of mobile phone pose detection, a neural network may be trained to recognize parts of the human body. Landmarks may be assigned using the neural network to the connected parts of a user's body depicted by an image frame. Real-world coordinates of the landmarks may be tracked over time from image frames. A distance (e.g., Euclidean) between a wrist and an eye view point (a midpoint between eyes of a user) may be calculated. An object (a mobile phone) may be detected, and a distance between the object and the eye view point may be calculated. A pose of the user may be classified. The classified pose can be stored, and a slope of a finger can be stored in memory. In this way, the pose of the user may be tracked over time to track user interaction with the mobile phone.

In an example of headphone pose detection, a neural network is trained to recognize parts of the human body. Landmarks can be assigned using the neural network to the connected parts of a user's body depicted by an image frame. Real-world coordinates of the landmarks can be tracked over time from image frames. A distance (e.g., Euclidean) between both wrists of the user's hands and an eye view point (a midpoint between eyes of a user) may be calculated as well as other identified markers, such as head tilt, a wrist, or elbow angle etc. An object (headphones) may be detected, and a pose of the user may be classified. The classified pose may be stored, and a slope of a finger or other positional information of other body parts may be stored in memory (e.g., positional information of fingers/hands relating to the user picking up and putting on headphones using hands/fingers of the user). In this way, the pose of the user may be tracked over time for tracking user interaction with the headphones.

In an example of smart watch pose detection, a neural network can be trained to recognize parts of the human body. Landmarks may be assigned using the neural network to the connected parts of a user's body depicted by an image frame. Real-world coordinates of the landmarks can be tracked over time from image frames. A distance between a wrist landmark can be calculated. An object (smart watch) is detected. A pose of the user can be classified based upon the wrist landmark (e.g., a location of the wrist with respect to a location of the smart watch). The classified pose can be stored, and a slope of a finger or other positional information of other body parts such as the wrist is stored in memory. In this way, the pose of the user may be tracked over time for tracking user interaction of the smart watch.

In some embodiments, a viewpoint is identified by the platform. A neural network can be trained to detect facial landmarks. The neural network can be used to identify landmarks of eyes, irises, and pupils. A right diameter of the right eye and a left diameter of the left eye can be determined using the landmarks of the eyes, and a midpoint will correspond to pupil coordinates. The midpoint of the pupils of both eyes can be used to obtain x, y, z coordinates. A length from the center of both pupils corresponds to a length passing from the left eye to the right eye. A midpoint of this length corresponds to a center point of the left and right pupils. This midpoint is tracked as the viewpoint of the user, which can be used to determine current positions of an eye cursor or tracking pad on a canvas or webpage.

In some embodiments, head direction can be identified by the platform. A midpoint between eyes of the user is calculated (e.g., the eyes of the user may be projected onto a virtual screen, which is used to identify the midpoint between the eyes). The viewpoint that was previously determined can be used to find an angle between the midpoint between the eyes of the user and the viewpoint of the user's gaze. This angle provides an angle or measurement used to understand a direction of a head with respect to the canvas. If the user moves the user's head diagonally up in a left or right direction, then a theta is determined with respect to the viewpoint. This change can be mapped to a quadrant that provides a direction in which the head is moving. Similarly, if the user moves the user's head diagonally down in a left or right direction, then this can be also tracked. A dtheta/time (or a change in theta with respect to time) helps determine a speed at which the user is changing a direction of head movement and if the user is moving backwards or forwards.

In some embodiments, the platform can be configured to detect an eye blink. Coordinates of the midpoint (viewpoint coordinates) can be used to obtain a z axis that is used to track changes in eye lids. When the midpoint moves towards a negative y direction downwards, then the eyes may be closing/closed. The eyes may be opening/opened when the viewpoint or midpoint moves upwards or comes to an origin point inline to a center of the pupils of both eyes. This can be used to calculate a time elapsed from the close to open and from the open to close of the eyes. A normal blink is generally less than a second long, and a time elapsed can be determined, such as where if the eyes are detected as being closed, then a timeout is set to about a 100 ms to trigger an open eye check function to see if the eyes are now open. If the eyes are now open, then a blink is detected.

In some embodiments, the platform can be configured to detect head movement. The viewpoint (midpoint) is detected and measured along a z axis. A change in the z axis (dz) while moving the viewpoint gives a change in head position. The angle or direction previously calculated can be used to determine an angle with respect to a screen midpoint, which is used to project the viewpoint to a quadrant. If the dz is positive, and dz and the angle is greater than about 250 degrees, then the head position is typically towards the left. If dz and the angle are less than about 250 degrees, then the head position is typically to the right. If dz is negative or less than about 10 degrees, then the head position is typically facing downwards. If dz is greater than about 10 degrees, then the head position is typically facing upwards.

In some embodiments, the platform can be configured to detect a distance from the user to the screen. A midpoint may be calculate using the formula: Midpoint=(Math.sqrt(Math.pow(righteyemidpoint[0]−lefteyemidpoint[0],2)+Math.pow(righteyemidpoint[1]−lefteyemidpoint[1],2))). If the angle of the head is constant and a floor value of the midpoint is increasing, then a distance of the viewpoint from the user is moving closer to the camera or to the canvas. Similarly, if the angle of the head position is constant and the floor value of the midpoint is decreasing or tending to zero, then a distance of the viewpoint from the user is moving further away from the camera or the canvas.

According to some embodiments, a method may be provided. The method may include generating a canvas populated with a first grid corresponding to a location of a first object. The canvas is populated with an eye cursor positioned to track a gaze of a user. A plurality of image frames captured by a camera is evaluated to track interaction of the user with the first object. For an image frame, a model is utilized to process the image frame to identify facial landmarks of the user. A midpoint between a left eye and a right eye of the user is determined based upon the facial landmarks. A current position of the eye cursor is set within the canvas based upon the midpoint. In response to detecting that the eye cursor intersects the first grid in the canvas, the user may be determined to be interacting with the first object. In response to the user interacting with the first object, an action may be performed based upon the interaction.

According to some embodiments, the object comprises an electronic device. The method comprises transmitting a command to the electronic device to modify operation of the electronic device.

According to some embodiments, the method includes tracking a timespan of the interaction. A level of interest of the user with the first object is outputted based upon the timespan.

According to some embodiments, the method includes populating the canvas with a plurality of grids corresponding to locations of objects. The canvas is populated with a second grid corresponding to a location of a second object. A determination is made as to whether the user interacts with the second object based upon whether the eye cursor intersects with the second grid.

According to some embodiments, the method includes populating the canvas with a plurality of grids corresponding to locations of objects. An authentication code corresponding to an order of interactions with one or more of the objects is generated. The user is authenticated based upon the user interacting with the one or more of the objects according to the order of interactions.

According to some embodiments, the method includes modifying a display property of the first grid in response to the eye cursor intersecting the first grid.

According to some embodiments, the method includes populating the canvas with a plurality of grids corresponding to locations of objects. Interactions of users with the objects is tracked within a data structure. Analytical processing is executed upon the data structure to determine users interests with the objects based upon the interactions, types of interactions, and lengths of the interactions.

According to some embodiments, the method includes receiving first user input defining the first grid, wherein the user input specifies a location, orientation, and size of the first grid; and populating the canvas with the first grid based upon the first user input.

According to some embodiments, the method includes in response to receiving second user input modifying the first grid, modifying at least one of the location, the orientation, or the size of the first grid based upon the second user input.

According to some embodiments, a device is provided. The device comprises a processor. The processor is configured to generate a canvas populated with grids corresponding to locations of objects. The canvas is populated with an eye cursor positioned to track a gaze of a user. A plurality of image frames captured by a camera are evaluated to track interaction of users with the objects. For an image frame, a model is utilized to process the image frame to identify facial landmarks of the user. A midpoint between a left eye and a right eye of the user is determined based upon the facial landmarks. A current position of the eye cursor is set within the canvas based upon the midpoint. In response to detecting that the eye cursor intersects a first grid in the canvas, the user may be determined as interacting with a first object represented by the first grid. In response to the user interacting with the first object, an action is performed based upon the interaction.

According to some embodiments, the processor is configured to generate a heat map for the first grid based upon user interaction with the first object. In response to the heat map indicating a level of interest in the first object that exceeds an interest threshold, an alert about an interest in the first object is generated and transmitted.

According to some embodiments, the processor is configured to determine an idle time of the user interacting with the first object based upon a timespan of the eye cursor intersecting the first grid. In response to the idle time exceeding a threshold timespan, an alert about an interest of the user with the first object is generated and transmitted.

According to some embodiments, in response to detecting a threshold amount of changes in movement of the eye cursor over a time frame, generating and transmitting an alert about an interest of the user with the first object.

According to some embodiments, the processor is configured to track a pattern of user interaction changes amongst the objects based upon an order and duration of the eye cursor intersecting the grids. An interest of the user is determined based upon the pattern.

According to some embodiments, a non-transitory computer-readable medium storing instructions that when executed facilitate performance of operations, is provided. The operations include generating a canvas populated with grids corresponding to locations of objects. The canvas is populated with an eye cursor positioned to track a gaze of a user. A plurality of image frames captured by a camera is evaluated to track interaction of users with the objects. For an image frame, a midpoint between a left eye and a right eye of the user is determined based upon facial landmarks of the user identified from the image frame. A current position of the eye cursor is set within the canvas based upon the midpoint. In response to detecting that the eye cursor intersects a first grid in the canvas, the user is determined to be interacting with a first object represented by the first grid. In response to the user interacting with the first object, an action may be performed based upon the interaction.

According to some embodiments, the operations include evaluating the plurality of image frames to track real-time 3D object orientation of the objects.

According to some embodiments, the operations include extracting features from the plurality of image frames corresponding to iris features, body features, voice features, and facial features.

According to some embodiments, the operations include evaluating the iris features to track iris and head movements.

According to some embodiments, the operations include evaluating the body features to track body poses; and evaluating the voice features and the facial features to for tone sentiment, text sentiment, and facial emotional expression.

According to some embodiments, the operations include populating the canvas with a plurality of eye cursors to track gazes of a plurality of users.

Figure 6:
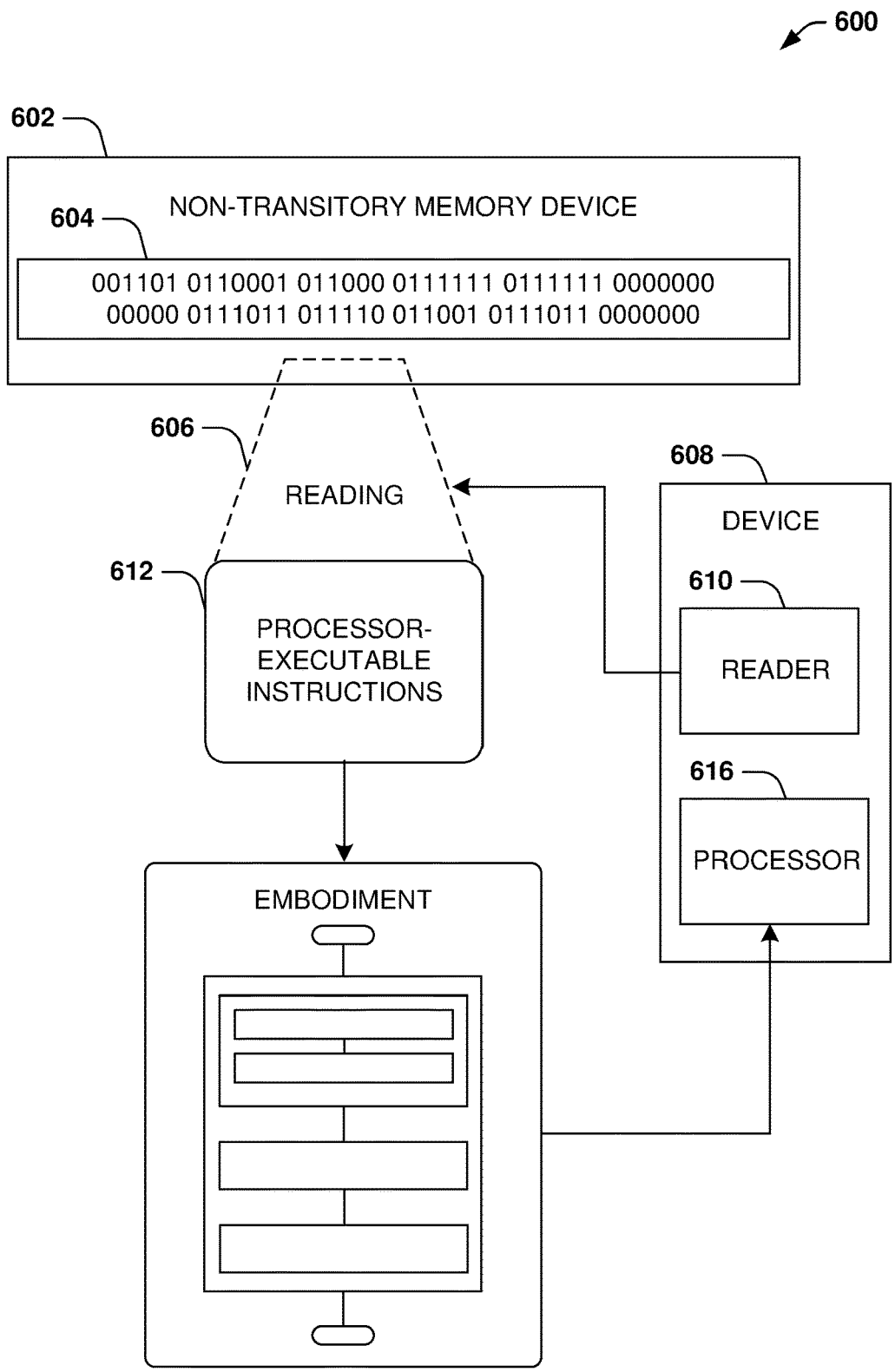
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 100 of FIG. 1, at least some of the example system 300 of FIGS. 3A and 3B, at least some of the example system 400 of FIG. 4, and/or at least some of the example system 500 of FIGS. 5A-5F.

Figure 7:
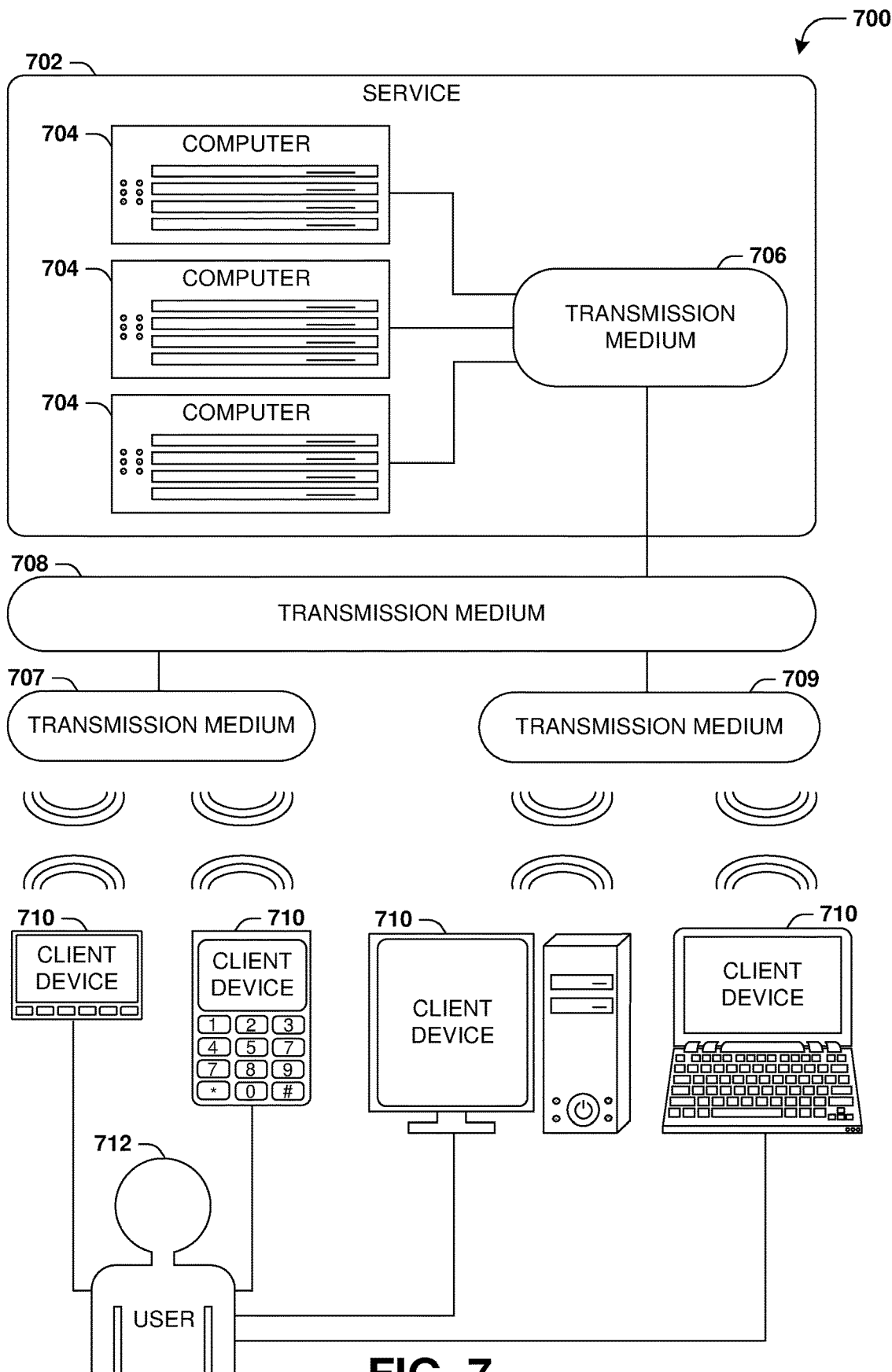
FIG. 7 is an illustration of example networks that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 707 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 702.11) network or a Bluetooth (IEEE Standard 702.15.1) personal area network). In this manner, the computers 704 and the client devices 710 may communicate over various types of transmission mediums.

Figure 8:
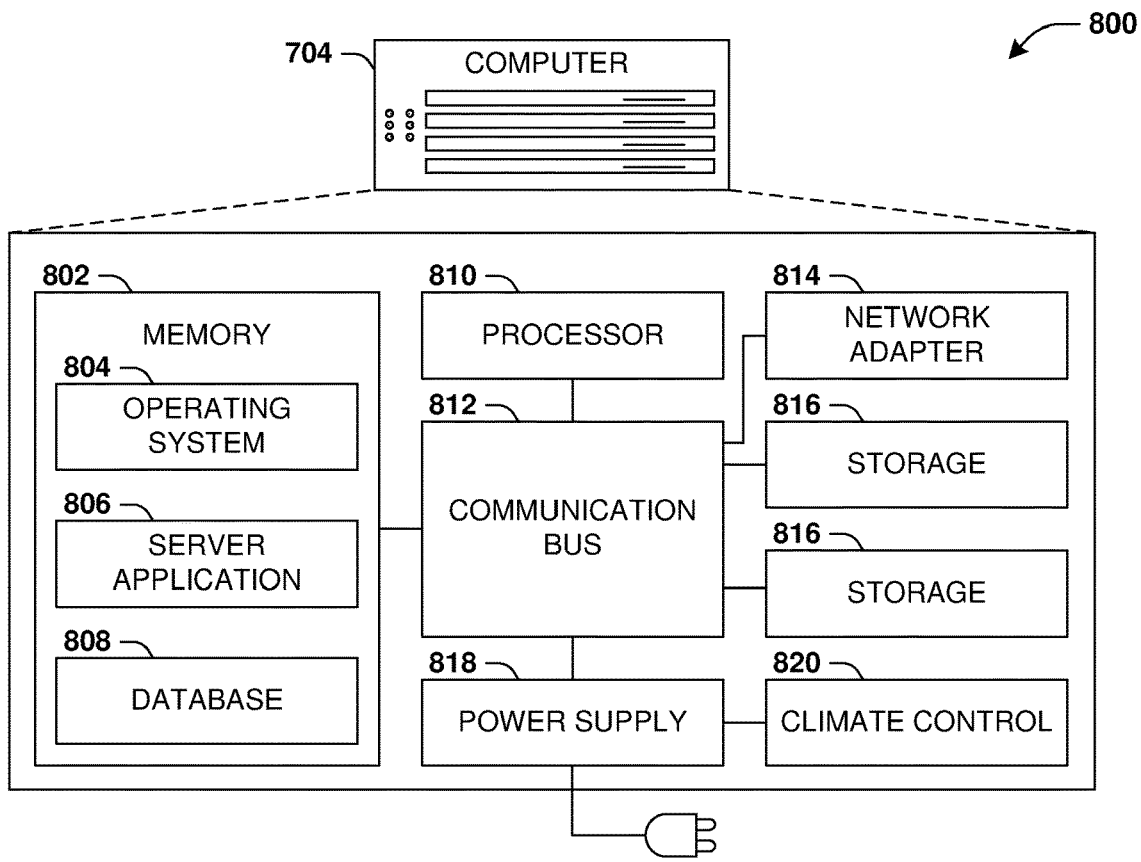
FIG. 8 is an illustration of a scenario involving an example configuration of a computer that may utilize and/or implement at least a portion of the techniques presented herein.

FIG. 8 presents a schematic architecture diagram 800 of a computer 704 that may utilize at least a portion of the techniques provided herein. Such a computer 704 may vary widely in configuration or capabilities, alone or in conjunction with other computers, in order to provide a service such as the service 702.

The computer 704 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 704 may comprise memory 802 storing various forms of applications, such as an operating system 804; one or more computer applications 806; and/or various forms of data, such as a database 808 or a file system. The computer 704 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 704 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 704 with at least one other computer. Other components that may optionally be included with the computer 704 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 704 to a state of readiness.

The computer 704 may operate in various physical enclosures, such as a desktop or tower, and/or may be integrated with a display as an "all-in-one" device. The computer 704 may be mounted horizontally and/or in a cabinet or rack, and/or may simply comprise an interconnected set of components. The computer 704 may comprise a dedicated and/or shared power supply 818 that supplies and/or regulates power for the other components. The computer 704 may provide power to and/or receive power from another computer and/or other devices. The computer 704 may comprise a shared and/or dedicated climate control unit 820 that regulates climate properties, such as temperature, humidity, and/or airflow. Many such computers 704 may be configured and/or adapted to utilize at least a portion of the techniques presented herein.

Figure 9:
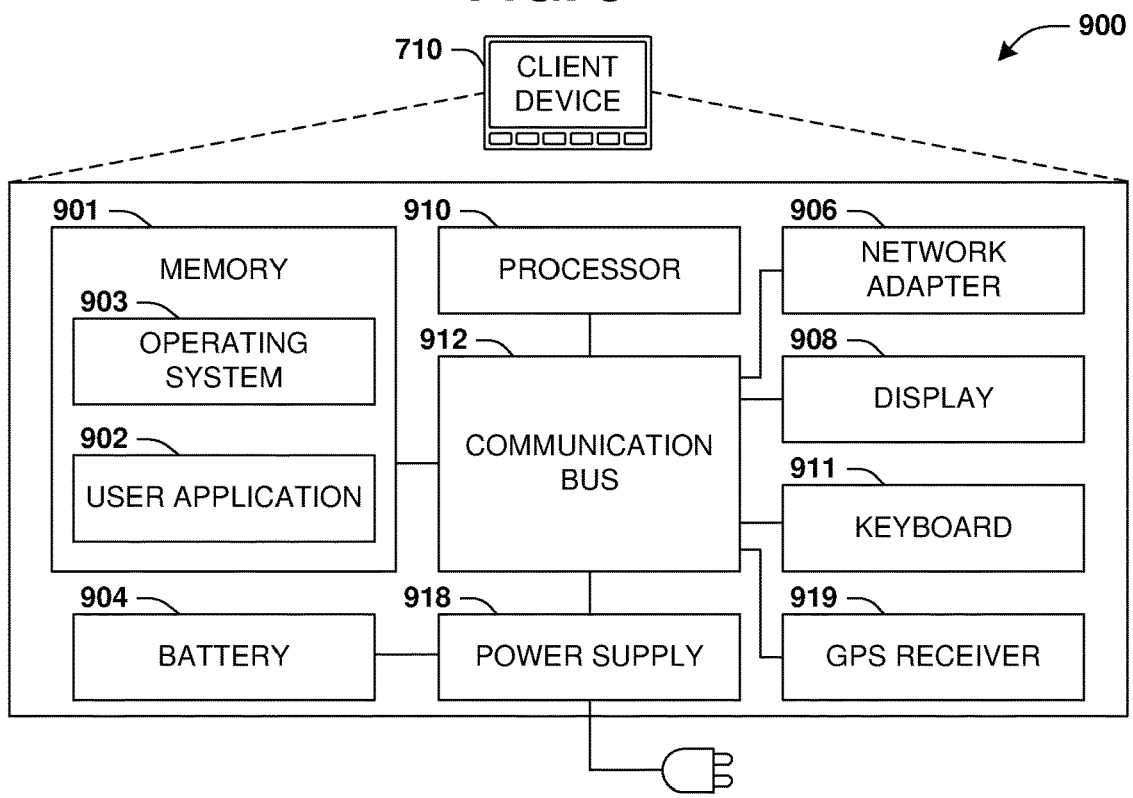
FIG. 9 is an illustration of a scenario involving an example configuration of a client that may utilize and/or implement at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    generating a canvas populated with a first grid corresponding to a location of a first object, wherein the canvas is populated with an eye cursor positioned to track a gaze of a user;
    evaluating a plurality of image frames captured by a camera to track interaction of the user with the first object, wherein for an image frame:
        utilizing a model to process the image frame to identify facial landmarks of the user;
        determining a midpoint between a left eye and a right eye of the user based upon the identified facial landmarks;
        setting a current position of the eye cursor within the canvas based upon the midpoint; and
        in response to detecting that the eye cursor intersects the first grid in the canvas, determining that the user is interacting with the first object; and
    in response to the user interacting with the first object, performing an action based upon the interaction.

2. The method of claim 1, wherein the first object comprises an electronic device, and wherein the performing the action comprises:
    transmitting a command to the electronic device to modify operation of the electronic device.

3. The method of claim 1, wherein the performing the action comprises:
    tracking a timespan of the interaction; and
    outputting a level of interest of the user with the first object based upon the timespan.

4. The method of claim 1, wherein the generating the canvas comprises:
    populating the canvas with a plurality of grids corresponding to locations of objects, wherein the canvas is populated with a second grid corresponding to a location of a second object; and
    determining whether the user interacts with the second object based upon whether the eye cursor intersects with the second grid.

5. The method of claim 1, wherein the generating the canvas comprises:
    populating the canvas with a plurality of grids corresponding to locations of objects;
    generating an authentication code corresponding to an order of interactions with one or more of the objects; and
    authenticating the user based upon the user interacting with the one or more of the objects according to the order of interactions.

6. The method of claim 1, comprising:
    modifying a display property of the first grid in response to the eye cursor intersecting the first grid.

7. The method of claim 1, comprising:
    populating the canvas with a plurality of grids corresponding to locations of objects;
    tracking, within a data structure, interactions of users with the objects; and
    executing analytical processing upon the data structure to determine users interests with the objects based upon the interactions, types of interactions, and lengths of the interactions.

8. The method of claim 1, wherein the generating the canvas comprises:
    receiving first user input defining the first grid, wherein the user input specifies a location, orientation, and size of the first grid; and
    populating the canvas with the first grid based upon the first user input.

9. The method of claim 8, wherein the generating the canvas comprises:
    in response to receiving second user input modifying the first grid, modifying at least one of the location, the orientation, or the size of the first grid based upon the second user input.

10. A device comprising:
    a processor configured to:
        generate a canvas populated with grids corresponding to locations of objects, wherein the canvas is populated with an eye cursor positioned to track a gaze of a user;
        evaluate a plurality of image frames captured by a camera to track interaction of users with the objects, wherein for an image frame:
            utilize a model to process the image frame to identify facial landmarks of the user;
            determine a midpoint between a left eye and a right eye of the user based upon the facial landmarks;
            set a current position of the eye cursor within the canvas based upon the midpoint; and
            in response to detecting that the eye cursor intersects a first grid in the canvas, determine that the user is interacting with a first object represented by the first grid; and
        in response to the user interacting with the first object, performing an action based upon the interaction.

11. The device of claim 10, wherein the processor is further configured to:

generate a heat map for the first grid based upon user interaction with the first object; and in response to the heat map indicate a level of interest in the first object that exceeds an interest threshold, generating and transmitting an alert about an interest in the first object.

12. The device of claim 10, wherein the processor is further configured to:

determine an idle time of the user interacting with the first object based upon a timespan of the eye cursor intersecting the first grid; and in response to the idle time exceeding a threshold timespan, generating and transmitting an alert about an interest of the user with the first object.

13. The device of claim 10, wherein the processor is further configured to:

in response to detecting a threshold amount of changes in movement of the eye cursor over a time frame, generating and transmitting an alert about an interest of the user with the first object.

14. The device of claim 10, wherein the processor is further configured to:

track a pattern of user interaction changes amongst the objects based upon an order and duration of the eye cursor intersecting the grids; and determine an interest of the user based upon the pattern.

15. A non-transitory computer-readable medium storing instructions that when executed facilitate performance of operations comprising:

generating a canvas populated with grids corresponding to locations of objects, wherein the canvas is populated with an eye cursor positioned to track a gaze of a user;

evaluating a plurality of image frames captured by a camera to track interaction of users with the objects, wherein for an image frame:

determining a midpoint between a left eye and a right eye of the user based upon facial landmarks of the user identified from the image frame;

setting a current position of the eye cursor within the canvas based upon the midpoint; and in response to detecting that the eye cursor intersects a first grid in the canvas, determining that the user is interacting with a first object represented by the first grid; and in response to the user interacting with the first object, performing an action based upon the interaction.

16. The non-transitory computer-readable medium of claim 15, wherein the operations comprise:

evaluating the plurality of image frames to track real-time 3D object orientation of the objects.

17. The non-transitory computer-readable medium of claim 15, wherein the operations comprise:

extracting features from the plurality of image frames corresponding to iris features, body features, voice features, and facial features.

18. The non-transitory computer-readable medium of claim 17, wherein the operations comprise:

evaluating the iris features to track iris and head movements.

19. The non-transitory computer-readable medium of claim 17, wherein the operations comprise:

evaluating the body features to track body poses; and evaluating the voice features and the facial features to for tone sentiment, text sentiment, and facial emotional expression.

20. The non-transitory computer-readable medium of claim 15, wherein the operations comprise:

populating the canvas with a plurality of eye cursors to track gazes of a plurality of users.

* * * * *